A. W. RAETTIG.
METALLIC RESILIENT TIRE.
APPLICATION FILED APR. 3, 1914.
1,143,995.
Patented June 22, 1915.
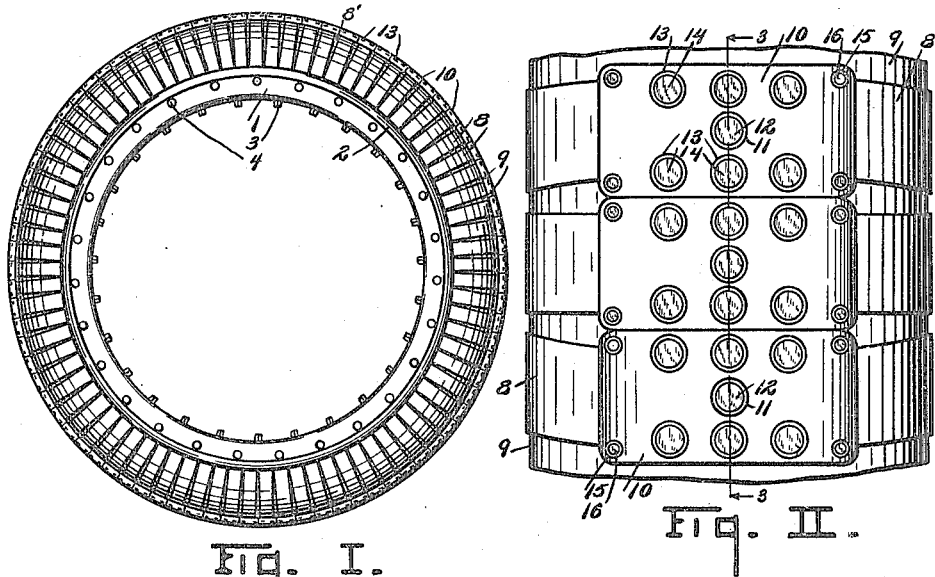
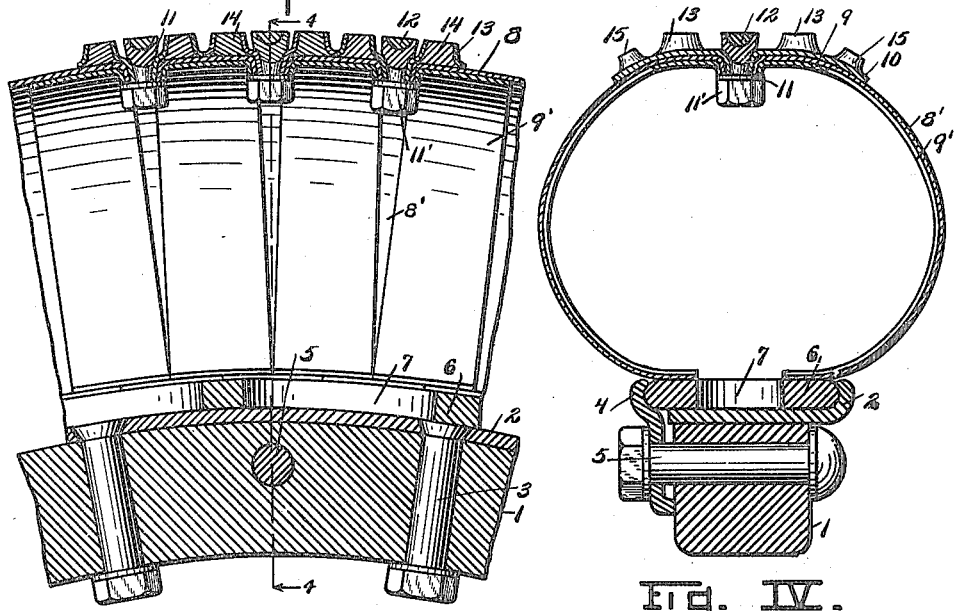

UNITED STATES PATENT OFFICE.

ALFRED W. RAETTIG, OF STURGIS, MICHIGAN.

METALLIC RESILIENT TIRE.

1,143,995.

Specification of Letters Patent. Patented June 22, 1915.

Application filed April 3, 1914. Serial No. 829,290.

*To all whom it may concern:*

Be it known that I, ALFRED W. RAETTIG, a citizen of the United States, residing at Sturgis, county of St. Joseph, State of Michigan, have invented certain new and useful Improvements in Metallic Resilient Tires, of which the following is a specification.

This invention relates to improvements in metallic resilient tires.

The objects of this invention are: First, to provide an improved resilient, metallic tire having no loose ends or joints, the entire tire being made of strips of spring metal having their ends welded or otherwise secured together. Second, to provide in a resilient, metallic tire, improved tread plates.

Further objects, and objects relating to details and economies of construction and operation, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing forming a part of this specification, in which:

Figure I is a view in side elevation of a wheel carrying a tire embodying my invention, the spokes of the wheel being omitted. Fig. II is a top plan view on an enlarged scale, of a portion of my improved tire. Fig. III is an enlarged detail sectional view on the line 3—3 of Fig. II. Fig. IV is a detail sectional view on the line 4—4 of Fig. III. Fig. V is a detail plan view on a reduced scale, of one of the spring tire members, the same being spread out flat.

In the drawing, similar reference characters refer to similar parts throughout the several views, and the sectional views are taken looking in the direction of the little arrows at the ends of the section lines.

Considering the numbered parts of the drawing, 1 represents the felly of a wheel, to which a rim member 2, provided with a clip portion or flange, is secured by means of a plurality of bolts 3, 3.

A rim attaching band 6 is provided which lies flat on the rim 2, and one edge of which is engaged by the flange upon said rim. The other edge of said rim attaching band 6 is engaged by the flange 4 which is secured in place by the bolts 5 extending transversely through the felly of the wheel, as clearly shown in Fig. IV. The band 6 is provided with a plurality of openings 7 therein for a purpose hereinafter to be described.

My improved tire is made up of a pair of members 8 and 9 which are made of vanadium steel or of any other metal which has the requisite amount of spring and resiliency and is capable of sustaining the weight without undergoing elastic fatigue. The members 8 and 9 are identical in shape and as shown in Fig. V, consist of central portions 8 and 9, and a plurality of spring fingers 8' and 9' extending from either edge of said central portions. The inner ends of the slots between the fingers are rounded, as shown in Fig. V, so as to prevent checking or cracking as the ends of said fingers are brought together. These spring fingers 8' and 9' are bent downwardly and the ends thereof are welded to the rim member 6, as shown in Fig. IV.

The spring fingers 8' and 9' are spaced apart sufficiently so that, when the strip is bent to the curvature of the finished tire, the ends of the spring fingers will abut each other as clearly shown in Fig. III.

The members 8 and 9 are assembled together with the fingers 8' of the outer member 8 covering the openings between the fingers 9' of the inner member 9. The two members 8 and 9 are then bent to conform to the curvature of the tire and the spring members 8' and 9' are bent inwardly and welded securely to the rim attaching band 6. The ends of the members 8 and 9 are welded together so as to present a substantially continuous integral structure without joints. Since the fingers 8' close the openings between the fingers 9' a substantially continuous tire structure is provided without any openings to allow dirt and dust to pass into the interior of the tire.

A plurality of tread plates 10, 10 are detachably secured to the tread portion of the tire by means of bolts 11 which pass through alined openings in the tread plates 10 and the tire members 8 and 9. The bolts 11 are held in place by means of lock nuts 11'. The head of the bolt 11 is provided with a cavity which is filled with noise deadening material 12, such as lead, babbitt, rubber, or the like.

The material of the tread plates and of the tire members 8 and 9 surrounding the holes through which the bolts 11 pass is struck inwardly, as clearly shown in Figs. III and IV so as to prevent the shifting of said parts relative to each other. The heads of the bolts 11 are also provided with shoulders which fit in said openings so as to prevent the turning of the bolts. The tread plate is provided with a plurality of struck up portions 13 and 15 forming cavities or pockets which are shaped to retain and are filled with noise deadening material 14 and 16 such as lead, babbitt, rubber, or the like, so as to give a more nearly noiseless tread.

From the description of the parts given above, the operation and construction of my device should be entirely clear. I have shown the rim attaching band 6 as secured to the felly of the wheel by means of the flanges 2 and 4, but it will be evident that any other means of securing the rim might be provided.

The tire members 8 and 9 are laid together, one on top of the other, so that the fingers 8' close the openings between the fingers 9' and the fingers 9' close the openings between the fingers 8'. The lower ends of the spring fingers are then welded to the edges of the rim attaching band 6 so that the entire structure is securely held in place upon the band 6. The tread plates 10 are then put in place with the openings therein in alinement with the openings in the tire members and are secured in place by means of the bolts 11. The nuts 11' on the bolt 11 are tightened by means of a wrench or other suitable instrument, access to said nut being provided through the openings 7 which are provided for that purpose in the rim 6.

It will be observed that the tire is made up of two members superimposed the one on the other, the ends of each member being welded together. This makes a continuous tire structure of spring metal without joints or loose ends. The openings between the spring fingers of the inner member are closed by the spring fingers of the outer member, thus preventing dirt and mud from entering the interior of the tire. The two tire members are fixed relative to each other and give together when compressed without any sliding relative to each other.

I am aware that the particular structure which I have here set forth, is susceptible of considerable variation without departing from the spirit of my invention and I therefore do not wish to be restricted to the same. I have found, however, that this structure is to be preferred, and I therefore desire to claim the same specifically as well as broadly, as indicated by my appended claims.

Having thus described my invention, what I claim as new and desire to secure by Letters Patent is:

1. A tubular sheet metal tire comprising a rim attaching band and a strip of spring metal forming the periphery of the tire and provided with a plurality of radially extending spring fingers on both edges thereof, said spring fingers having parallel edges, the ends of said fingers being secured to said rim attaching band with the edges of the ends abutting each other, substantially as described.

2. A tubular sheet metal tire comprising a rim attaching band and a pair of strips of spring metal forming the periphery of the tire and provided with a plurality of radially extending spring fingers on both edges thereof, said spring fingers having parallel edges, the ends of said fingers being secured to said rim attaching band with the edges abutting each other, said strips being superimposed one upon the other with the fingers of one strip covering the openings between the fingers of the other strip, substantially as described and for the purpose specified.

3. A tubular sheet metal tire comprising a rim attaching band, and a pair of strips of spring metal forming the periphery of the tire, the edges of said strips being provided with a plurality of spring fingers, the ends of said fingers being secured to said rim attaching band, tread plates disposed on the periphery of said tire, openings in said strips having down turned flanges around the same, apertures in said tread plates having down turned flanges disposed in the openings through said strips, and securing means passing through said tread plates and said strips, all coacting substantially as described for the purpose specified.

In witness whereof, I have hereunto set my hand and seal in the presence of two witnesses.

ALFRED W. RAETTIG. [L. S.]

Witnesses:
H. W. HAGERMAN,
LOUISE HAGERMAN.